United States Patent
Diesnis et al.

(10) Patent No.: US 10,183,437 B2
(45) Date of Patent: Jan. 22, 2019

(54) ROTARY MACHINE AND METHOD FOR HYDRAULIC FORMING OF SHAPED CONTAINERS

(71) Applicant: DISCMA AG, Hunenberg (CH)

(72) Inventors: Daniel Diesnis, Octeville sur Mer (FR);
Benoit Picot, Octeville sur Mer (FR);
Luc Desoutter, Octeville sur Mer (FR)

(*) Notice: Subject to any disclaimer, the term of this patent is extended or adjusted under 35 U.S.C. 154(b) by 279 days.

(21) Appl. No.: 15/302,665

(22) PCT Filed: Apr. 3, 2015

(86) PCT No.: PCT/EP2015/097003
§ 371 (c)(1),
(2) Date: Oct. 7, 2016

(87) PCT Pub. No.: WO2015/155371
PCT Pub. Date: Oct. 15, 2015

(65) Prior Publication Data
US 2017/0028611 A1    Feb. 2, 2017

(30) Foreign Application Priority Data
Apr. 8, 2014 (EP) .................................... 14305510

(51) Int. Cl.
| B29C 49/46 | (2006.01) |
| B29C 49/36 | (2006.01) |
| B29D 22/00 | (2006.01) |
| B29C 49/06 | (2006.01) |
| B29C 49/12 | (2006.01) |

(52) U.S. Cl.
CPC .............. *B29C 49/46* (2013.01); *B29C 49/36* (2013.01); *B29D 22/003* (2013.01); *B29C 49/06* (2013.01); *B29C 49/12* (2013.01); *B29C 2049/4664* (2013.01)

(58) Field of Classification Search
CPC .............................. B29D 22/003; B20C 49/46
See application file for complete search history.

(56) References Cited

U.S. PATENT DOCUMENTS 3,267,185 A    8/1966   Freeman, Jr.
3,345,686 A *  10/1967  Di Settembrini ....... B29C 49/36
                                                              264/543

(Continued)

FOREIGN PATENT DOCUMENTS

WO    2013/020885 A1    2/2013

*Primary Examiner* — Joseph A Miller, Jr.
(74) *Attorney, Agent, or Firm* — Eric J. Sosenko; Jonathan P. O'Brien; Honigman Miller Schwartz and Cohn LLP (57) ABSTRACT

A rotary apparatus for hydraulic forming of shaped containers including a rotatable forming wheel having a central axis of rotation and a plane of rotation perpendicular to the axis of rotation. A plurality of forming stations is supported by the forming wheel. The forming stations are operable to expand a preform into a shaped container by forcing a liquid into the preform. The longitudinal axis of each forming station forms an angle with the plane of rotation of the forming wheel of less than 20° while the preform is being expanded. The projection of the longitudinal axis of each forming stations onto the plane of rotation of the forming wheel forms an angle with the radial direction at the position of the forming station of less than 20° while the preform is being expanded.

9 Claims, 7 Drawing Sheets

(56) References Cited

U.S. PATENT DOCUMENTS

| | | |
|---|---|---|
| 4,054,017 A | 10/1977 | Naumann |
| 2012/0048683 A1 | 3/2012 | Forsthoevel et al. |
| 2012/0207872 A1 | 8/2012 | Lisch et al. |
| 2013/0106028 A1 | 5/2013 | Lisch et al. |

* cited by examiner

ROTARY MACHINE AND METHOD FOR HYDRAULIC FORMING OF SHAPED CONTAINERS

CROSS-REFERENCE TO RELATED APPLICATIONS

This application is the U.S. national phase of International Application No. PCT/EP2015/097003 filed on Apr. 3, 2015 and claims priority to European Application No. 14305510.1 filed on Apr. 8, 2014, the disclosures of which are incorporated in their entirety by reference herein.

TECHNICAL FIELD

The present invention relates to rotary machines for manufacturing filled liquid containers.

More specifically, the present invention relates to rotary machines for manufacturing a filled liquid container from a preform formed by injecting the liquid into the preform.

BACKGROUND

The process of manufacturing liquid containers from polymeric materials has been widely used for many decades now. More specifically, such containers are often manufactured using a stretch blow molding process in which a pre-manufactured preform is softened by heating and then inserted into a blow mold. By first mechanically stretching the softened preform using a stretch rod and second blowing high pressure air into the preform, the preform is expanded until its shape conforms to the inner surface of the blow mold and thus forms—after cooling—a shaped container, such as a bottle. At the end, the shaped container is removed from the mold and transferred over to downstream processing steps such as filling, closing, and labeling.

Producing a filled container using the known stretch blow molding process, however, always requires two separate steps, blowing and filling. Due to the different natures of these two steps and the time it takes to complete them, these two process steps are typically carried out by two different machines which are operating sequentially in the same manufacturing line. In some instances, empty containers are even produced in one factory and shipped to a second factory in order to be filled at a later point in time. Many state of the art filling machines rely on gravitational flow of the liquid consumable into the empty container. Often, the fill nozzle does not touch the neck of the container during the filling process such that using an elevated pressure for urging the liquid into the container without causing significant spillage is not possible. Such a filling process relying on gravitational forces takes considerable time—especially for large bottles—of ten to twenty seconds per bottle and more.

It has already been suggested (see for example U.S. Pat. No. 3,267,185 published on Aug. 16, 1966) to combine the steps of expanding the preform into a shaped container and of filling the shaped container by using the consumable liquid as the fluid medium for imparting the pressure onto the preform to cause its expansion. After this step, the consumable liquid is already inside the container and the subsequent filling step is no longer necessary. This process of simultaneously forming and filling a shaped container is termed hydraulic forming. In a system described in U.S. Pat. No. 3,267,185 mold stations circulate along a circular path. A tube is extruded along the circular path. The tubular parison is progressively closed, forming a first end of the future container. Then the closed tubular shape is filled and expended. Then the other end of the future container is closed and cut. A drawback of such a system is that the throughput is very low.

Industrializing the process of manufacturing filled shaped containers from polymeric materials usually takes the form of rotary machines, each comprising a rotary wheel. A plurality of rotary machines is coupled to form a manufacturing line. The manufactured container is transported along an arcuate path by the rotation of the rotary wheel of the first machine and then transferred to the second machine where it is again transported by rotation of the rotary wheel along an arcuate path. That way, a continuous manufacturing process which can accommodate high manufacturing throughputs is made possible. Linear machines—in contrast thereto—operate in batch mode only and cannot be accelerated to achieve the same high throughputs at which rotary machines can be operated. Linear machines are used only under exceptional circumstances such as low output equipment.

An apparatus described in US2012/0048683A1 comprises a transport device having a central rotation axis. A receiver device, for example a gripper clamp, receives a preform. The receiver device has a swivel movement driven by a servo drive such that the resulting force extends in the longitudinal direction of the preform. US2012/0048683A1 further describes an air blow machine having a blow mold, a stretch rod for forming a preform. All the described embodiments have the neck of the preform oriented outwardly with respect to the machine rotation axis. Upon rotation of the machine, a compression force is exerted on the lower section of the preform including the closed end of the preform.

Document WO2013/020885 describes in its FIG. 3 a rotary system for simultaneously blowing and filling plastic containers. The longitudinal axes of the molding stations are inclined at 45° relative to the vertical axis. The document explains that this inclination makes it possible to avoid splashing of the liquid due to the centrifugal force exerted on the liquid in motion.

Figure 1A:
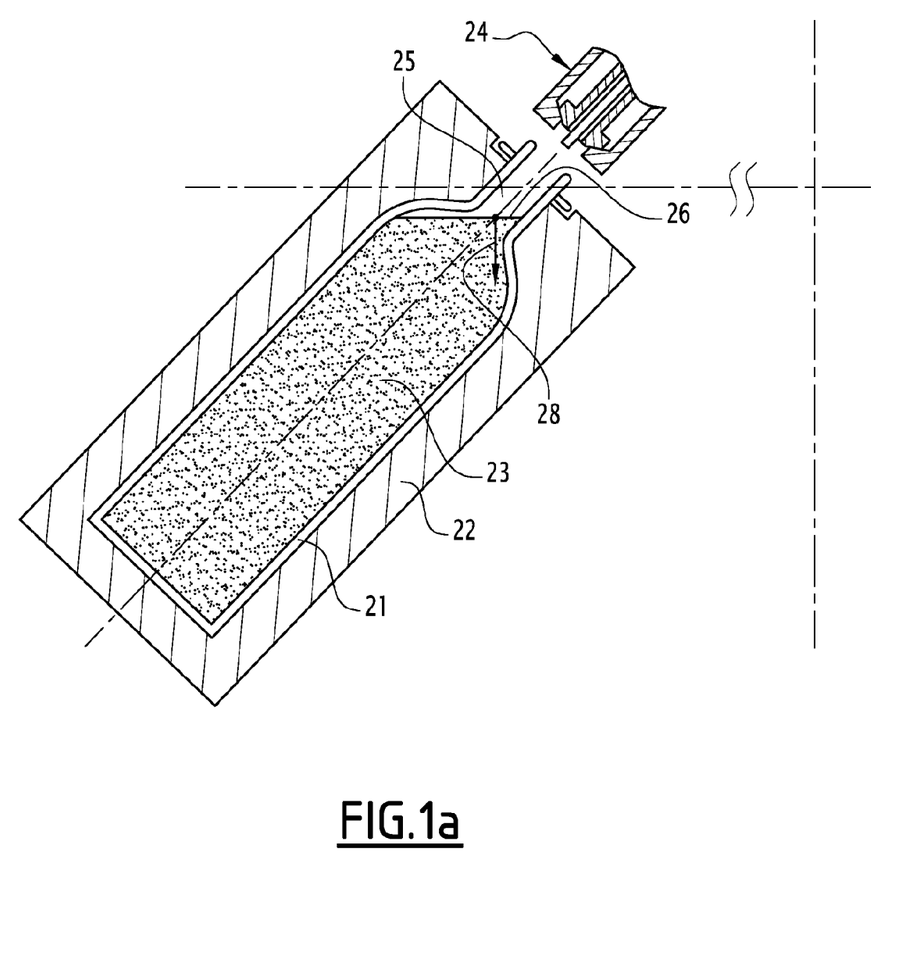
FIG. 1a shows a free level of liquid inside a container formed at a low rotation speed by a machine of the prior art.
Figure 1B:
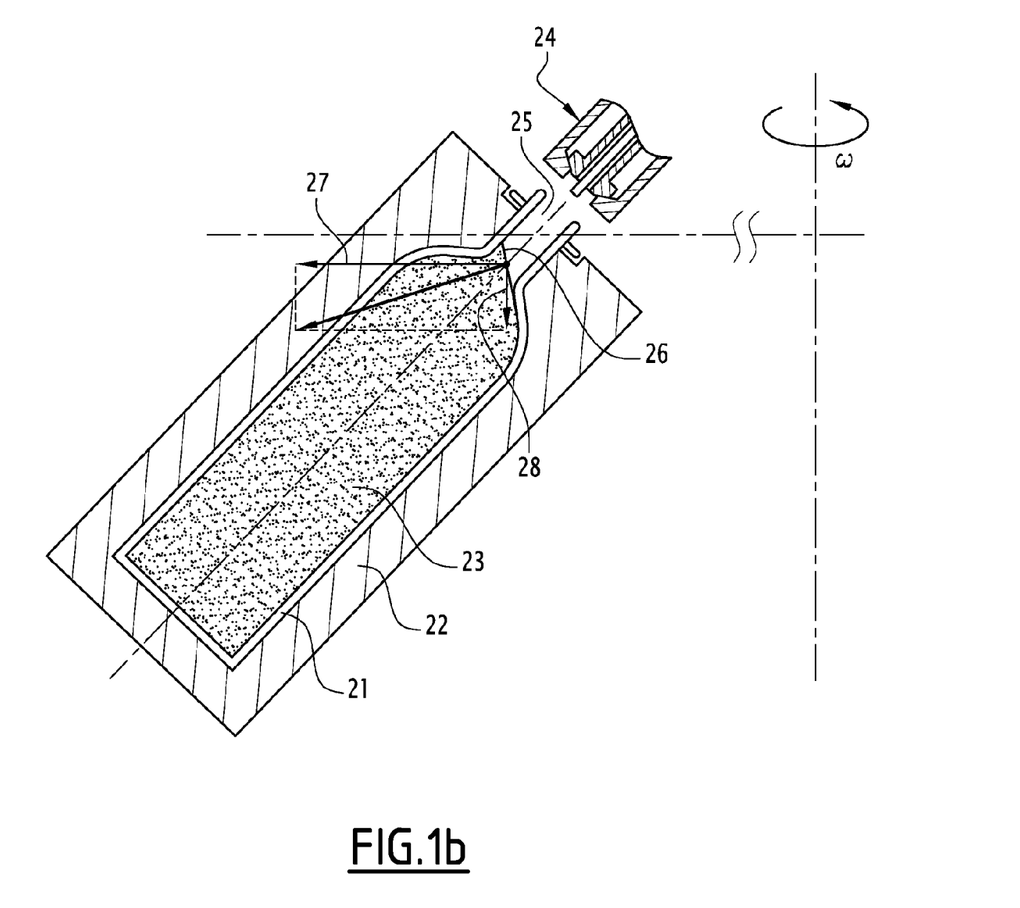
FIG. 1b shows a free level of liquid inside the container formed at a high rotation speed by the machine of FIG. 1a, FIG. 1c shows a potential drawback discovered by the applicant on the machine of FIG. 1a, FIG. 2 shows a end view of a first embodiment of the rotary machine according to the invention for hydraulic forming of shaped containers along a direction parallel to the plane of the axis of rotation.

The inventors of the current invention have discovered that the example of an inclination of 45° indicated in WO2013/020885 is an optimized value of the inclination for preventing spillage for almost any rotational speed. As illustrated in FIG. 1a, when the container 21 has been expanded up to the shape of the mold 22 and is full of liquid 23, the injection nozzle 24 is retracted and an head space 25 free of liquid is provided, for example during the nozzle retraction. Therefore, there is a free level of liquid 26 inside the formed container with the atmospheric pressure above it. The orientation of the free level of liquid depends on the rotation speed of the machine. If the rotation speed is very low or null, the free level of liquid would be almost horizontal as illustrated in FIG. 1a. The liquid free level is inclined by almost 45° inside the container. The size of the free head space 25 is such that the liquid is still contained in the container without splashing. FIG. 1b illustrates the position of the free level when the centrifugal acceleration 27 due to the rotation speed is more than 4 times the gravity acceleration 28. The liquid free space is almost vertical and so inclined by 45° inside the container. There is no splashing.

Figure 1C:
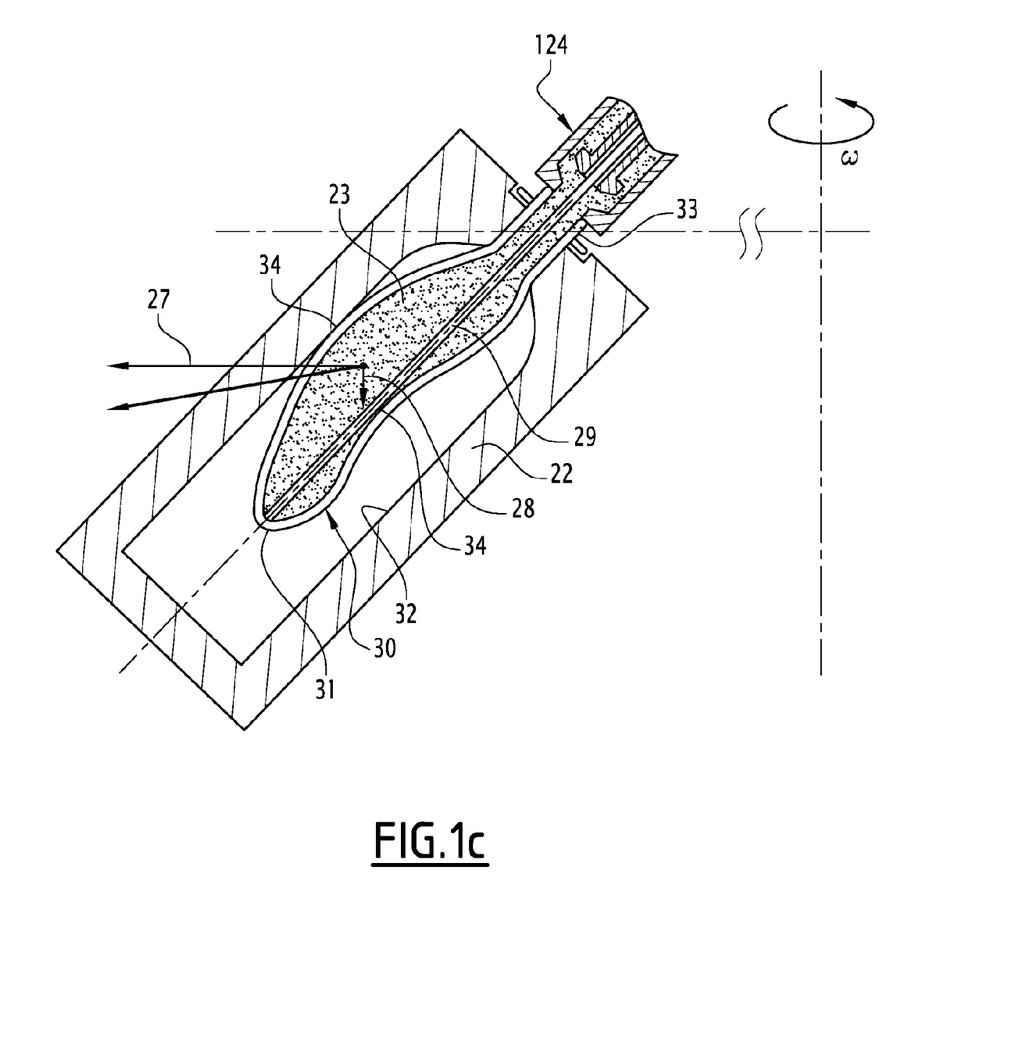

The inventors of the current invention have further discovered a drawback of the rotary system described in WO2013/020885, which is illustrated in the current FIG. 1c. The forming method may include introducing the stretch rod 29 down to the bottom of the heated preform 30. The stretching force exerted by the stretch rod contributes to keep the bottom 31 of the preform 30 well centered inside the cavity 32. When the liquid is injected in the preform, the centrifugal acceleration 27 exerted on the liquid tends to move the liquid and the central part of the preform 30 outwardly, and to bend the preform 30 even if the preform is guided by its neck 33 and by its bottom 31. This may provoke cold spots 34 on the container when the central part of the preform 30 under expansion comes too early in contact with the cold wall of the mold 22 or of the stretch rod 29. This may provoke some container blowouts. That phenomenon did not exist when the forming fluid was air, wherein the tension of the preform 30 provided by the stretch rod is high enough to keep the preform well centered inside the cavity all along the expansion phase. With a forming fluid being a liquid, guiding the preform by it neck and by its bottom may not be sufficient to avoid cold spots and blowouts.

A further complexity for rotary apparatus and processes is that the shaped container should preferably be removed from the mold after hydraulic forming in an upright position in order to reduce the risk of spillage and provide for transferability to further processing on rotary machines. If the shaped container is removed from the mold in a tilted orientation in order to accommodate for centrifugal forces while being expanded on the forming wheel, this tilt would have to be reversed or at least be eliminated before the shaped container can be placed on the arcuate manufacturing path of a downstream rotary wheel which must rotate in the opposite direction.

It is accordingly desirable to overcome the above disadvantages of the prior art machines for manufacturing filled shaped containers. In one aspect, it is desirable to develop a rotary machine which is capable of performing the hydraulic forming process at high throughputs. It is another aspect to develop a rotary process for hydraulic forming of shaped containers. It is another aspect to provide a rotary apparatus and a rotary process for hydraulic forming of shaped containers which reduce the detrimental effect of centrifugal forces acting on the expanding preform.

SUMMARY OF THE INVENTION

In one aspect, the present invention provides a rotary apparatus for hydraulic forming containers from preforms, comprising a rotatable forming wheel having a central axis of rotation and a plane of rotation perpendicular to the axis of rotation. A plurality of forming stations is supported by the forming wheel. The forming stations are operable to expand a preform into a shaped container by forcing a liquid into the preform. The longitudinal axis of each forming station forms an angle with the plane of rotation of the forming wheel of less than 25° while the preform is expanded. The projection of the longitudinal axis of each forming stations onto the plane of rotation of the forming wheel forms an angle with the radial direction at the position of the forming station of less than 25° while the preform is expanded.

Advantageously, each forming station has a closed configuration in which the forming station includes a preform seat arranged to receive a preform neck and a molding cavity arranged to receive a body portion of a preform. The longitudinal axis is defined as passing by the preform seat center and by the molding cavity center. A radial line is defined as passing by the molding cavity center and as being perpendicular to and passing by the central axis of rotation.

Advantageously, for each forming station, the longitudinal axis forms with the radial line an angle within the range of [5°, 25°] in any of the directions around the radial line.

The applicant has discovered that the particular selection of the inclination of the longitudinal axis of the forming station provides the machine with a surprising technical advantage. In such a machine, the bending risk of the preform during it expansion by liquid injection into the preform is reduced and almost suppressed, contrary to the situation described in connection with FIG. 1c. For example, for a full range of rotation speeds providing a centrifugal acceleration comprised between 1.73 and 11.4 times the gravity acceleration, the resulting force ($F_{inclined}$) exerted on the liquid perpendicularly to the longitudinal direction is below 10% of the force ($F_{\parallel}$) exerted when the longitudinal direction is parallel to the central rotation axis. Such a range of rotation speed covers most of the high throughput machines.

| Inclination of the longitudinal axis | Centrifugal acceleration providing $F_{inclinded} < 10\%$ of $F_{\parallel}$ (G = gravity acceleration) | |
|---|---|---|
| | Minimum | Maximum |
| 25° | 1.73 G | 11.4 |

Additionally, hydraulic forming machines having longitudinal axes inclined at an angle less than 25° relative to the radial line provide an even better reduction of the bending risk for a particular range of rotation speeds. The table below shows, for each inclination of the longitudinal axis, the range of rotation speeds for which the resulting force ($F_{inclined}$) exerted perpendicularly to the longitudinal axis is below 5% of the corresponding force ($F_{\parallel}$) when the longitudinal axis is parallel to the central rotation axis.

| Inclination of the longitudinal axis | Centrifugal acceleration providing $F_{inclinded} < 5\%$ of $F_{\parallel}$ (G = gravity acceleration) | |
|---|---|---|
| | Minimum | Maximum |
| 25° | 1.73 G | 2.74 G |
| 20° | 2.14 G | 3.73 G |
| 15° | 2.74 G | 5.67 G |
| 10° | 3.73 G | 11.4 G |
| 5° | 5.67 G | infinity |

In a particular embodiment of the present invention, the neck seat center is closer to the central axis of rotation than the cavity center, at least while the forming station is operated to expand the preform. In other words, the preform has a neck portion with an opening and the forming station is oriented on the forming wheel such that the opening is facing inwardly. This feature, in combination with the selected inclination of the mold longitudinal axis makes the centrifugal force exerted on the injected liquid contributing to the expansion of the preform. Orienting the opening inwardly is a further new and inventive feature because the above advantage appears when the forming fluid is liquid. It is at the opposite of the teaching of US2012/0048683. That particular embodiment may provide a significant reduction of the energy needed to actuate the stretch rod. Additionally, this embodiment offers the possibility of having a hydraulic forming machine and/or method not using an internal stretch rod. This improves drastically the hygiene of the hydraulic forming. An embodiment without stretch rod can be used with or without an external rod guiding the bottom of the preform during the preform expansion.

According to another aspect of the invention, the forming station according to the present invention is operable to support the preform in an orientation in which the longitudinal axis of the preform is parallel to the longitudinal axis of the forming station.

According to another aspect of the invention, the longitudinal axis of each forming station is oriented essentially parallel to the plane of rotation of the forming wheel.

According to another aspect of the invention, the projection of the longitudinal axis of each forming stations onto the plane of rotation of the forming wheel is essentially aligned with the radial direction at the position of the forming station. This allows for a closer alignment of the centrifugal force acting on the expanding preforms with the direction of longitudinal expansion of the preform. If the preform is arranged with its longitudinal axis in a direction which is essentially perpendicular to the plane of rotation of the forming wheel, then the angle of 90° between the centrifugal force and the direction of longitudinal expansion cannot be overcome and the centrifugal force cannot be aligned with the direction of longitudinal expansion. In the rotary apparatus of the present invention, the forming stations and the direction of longitudinal expansion of the preforms are in better alignment and preferably in essential alignment with each other. The component of the centrifugal force not acting on the preform in the direction of longitudinal expansion is reduced. Accordingly, the preform can be designed with less structural rigidity able to withstand these detrimental forces and hence with using less raw material.

Increasing the machine speed will generally require the expanding preforms to be transported along the manufacturing path at a higher velocity. Accordingly in a rotary machine, the centrifugal forces acting on the expanding preform will increase with the square of the translational velocity of the preform. After aligning the centrifugal forces with the direction of the longitudinal expansion, the increasingly detrimental effect of the centrifugal forces leading to unevenly expanded containers in conventional apparatus is not only reduced, it even supports the longitudinal expansion of the preform.

According to another aspect of the invention, the axis of rotation of the forming wheel forms an angle of less than 30° with the horizontal plane. According to another aspect of the invention, the axis of rotation of the forming wheel is essentially parallel to the horizontal plane.

Bringing the rotary apparatus of the present invention into a configuration in which the gravitational force acting on the expanding preform is in better alignment with the plane of rotation than in the known configuration with a vertical axis of rotation allows the gravitational force to be in better alignment with the direction of longitudinal expansion of the preform as well. Considering both the gravitational and centrifugal forces, this configuration of the rotary apparatus provides for a good alignment of both forces with the direction of longitudinal expansion in a certain sector of the rotary manufacturing path. This sector is sufficient for performing the critical parts of the hydraulic expansion of the preform, thereby reducing the detrimental effects of forces acting on the expanding preform which have a significant component perpendicular to the direction of longitudinal expansion.

According to another aspect of the invention, the preform has a neck portion with an opening and the forming station is oriented on the forming wheel such that the opening is facing inwardly.

When the preform is arranged such that its opening faces inwardly towards the center of rotation of the forming wheel, then the centrifugal force acting on the liquid inside the preform will force the liquid into the preform. The risk of spillage is thus reduced while the preform is rotated around the rotational axis of the forming wheel in this orientation.

It is a second aspect of the present invention to provide a method for hydraulic forming of a shaped container from a preform comprising the steps of
   placing a preform in a forming station, the forming station having a longitudinal axis,
   transporting the forming station along an arcuate manufacturing path while hydraulically expanding the preform inside the forming station,
   removing a filled shaped container from the forming station,
   whereby the orientation of the resulting acceleration on the liquid hydraulically expanding the preform always forms an angle of less than 10° with the longitudinal axis of the forming station while the preform is expanded into the shaped container.

Advantageously, the resulting acceleration results from the combination of gravity acceleration and centrifugal acceleration due to said transporting the forming station along an arcuate manufacturing path.

Advantageously, the resulting acceleration on the liquid hydraulically expanding the preform forms an angle of less than 5° with the longitudinal axis of the forming station.

During the expansion phase, the expanding preform is most vulnerable to forces having a component perpendicular to the direction of expansion. Such forces will cause the preform to expand asymmetrically with respect to the direction of expansion. The resulting container will be weaker in the region which is additionally stretched by such deformation. This weakness must be compensated by additional material leading to higher cost. Performing the expansion process such that the angle between the resulting acceleration and the direction of expansion (longitudinal dimension of the forming station) remains below 20° during the expansion, mitigates the detrimental effects of force components acting perpendicularly to the direction of expansion.

According to another aspect of the present invention, the method for hydraulic forming of a shaped container from a preform is performed such that the longitudinal axis of the forming station is oriented at an angle of less than 20° with the vertical direction when the preform is placed in the forming station.

In this orientation, the alignment of the longitudinal axis of the forming station which substantially coincides with the longitudinal axis of the inserted preform with the vertical direction ascertains that the gravitational force only exerts a limited bending force on the heated and hence softened preform.

According to another aspect of the present invention, the method for hydraulic forming of a shaped container from a preform is performed such that the longitudinal axis of the forming station is oriented at an angle of less than 20° with the vertical direction when the filled shaped container is removed from the forming station. Preferably, the shaped container is removed from the forming station in an essentially upright position close to the lowermost position of the forming station on its arcuate path.

In this orientation, the alignment of the longitudinal axis of the forming station which substantially coincides with the longitudinal axis of the filled container with the vertical direction ascertains that the gravitational force acts to keep the liquid in the filled container to not increase the risk of spillage. By removing the filled container at the lowermost position on the arcuate path of the forming station, the centrifugal force also acts substantially in alignment with the longitudinal direction of the bottle further limiting the risk of spillage.

DETAILED DESCRIPTION OF THE INVENTION

The present invention relates to a rotary machine, or rotary apparatus, for hydraulic forming of shaped containers.

As used herein, the term "container" relates to a container for storing a consumable. Containers have an internal cavity defined by an interior surface of the container walls. The internal cavity defines the storage volume of the container. For beverages, single serve containers having a storage volume from about 100 to about 500 milliliters, multi-serve containers having a volume from about 500 to about 3000 milliliters, as well as large containers having volumes from about 3000 milliliters to about 30 liters and more are generally known. For other applications such as storage of liquid drugs, smaller container sizes are also known. For yet other applications such as fuels, larger container sizes are known. The interior cavity of the container is accessible from the outside through an opening. The opening may be closable by a closure, such as a cap or a lid. The closure may be an integral part of the container and movably connected to the outer wall of the container, for example by means of a hinge. The closure may also be a separate part that is not permanently attached to the container, such as screw top or a crown. The closure may be reversibly attachable to the container for repeated opening and closing of the container. The closure may comprise a movable part that can be moved by the user from an open configuration to a closed configuration, such as a sports cap.

The shape of the container is defined by the outer surface of the container walls. In principal, the container can have any size and shape. The container may have a top portion including the opening, a bottom portion opposite the top portion, and a center portion connecting top and bottom portion. The dimension from the top portion to the bottom portion of the container is generally referred to as the longitudinal dimension. The container may comprise a neck portion surrounding the opening and a shoulder portion connecting the neck portion with the side walls. The container may comprise a base for placing the container on a surface. The base may form part of the bottom portion. When placed on a surface, the base of the container is in contact with the surface in at least three points. The base may also be in contact with the surface along a standing surface such as a standing ring. The side walls connect the base of the container with the container walls in the top portion.

As used herein, the term "shaped containers" refers to containers offering at least partial resistance against a change in geometric shape. For example, a simple plastic pouch is not a shaped container while a plastic bottle is a shaped container. Shaped containers can virtually take any shape including without limitation the shape of a bottle, a canister, a box, a keg, or a barrel. The resistance against deformation by external forces can be different for various parts of the container and in different directions of a container. Many containers, such as bottles, have a longitudinal dimension that is substantially larger than any transverse dimension. Often, the resistance to deformation in the longitudinal direction is much larger than the resistance to deformation in the transverse direction so that the containers are stackable for bulk transport. An empty shaped container may exhibit a significant reduced resistance against deformation as compared to a filled container, especially when the container is closed at an internal pressure above atmospheric pressure.

The term "liquid medium" or "consumable" refers to a physical medium. It designates any medium which is incompressible and able to flow. It is suitable for expanding preforms. The liquid can have a low viscosity (like water or alcohol), a medium viscosity (like edible oil or soup), or a high viscosity (like yogurt or a creamy product). The liquid can be homogeneous or not homogeneous (including fruit pulp or bits of foodstuff). The liquid medium is not limited to foodstuff. The incompressible liquid may be for example water, or other beverages, body care products, home and garden care products, medical fluids, fuels, operating fluids, and the like. It could include water, juice, dairy products, edible oils, household liquids such as detergents, body hygiene and care liquids such as soap, shampoo, and lotions, medical liquids such as saline solutions or liquid medicament preparations, chemicals such as liquid solvents, industrial liquids such as (non-combustible) fuels and lubricants or any other suitable liquid consumable.

The term "filled container" as used herein refers to a container, preferably a shaped container, that is filled to a fill level with a consumable, such as a liquid consumable. Preferably, the filled container is substantially completely filled at a fill level that optimizes the amount of product transported to the consumer while at the same allowing reliably production of the filled containers and reducing the risk of spilling or other waste of the consumable.

Preferably, the apparatus or machine of the present invention is an apparatus for manufacturing filled containers from preforms.

As used herein, the term "preform" refers to any piece of material that may be converted into a container by blowing. The preform may have a hollow body defining an internal volume and a neck portion with an opening for accessing the internal volume of the preform. A preform may have a shape similar to that of a test tube being closed at the lower end and having the neck with the opening at the upper end. The preform may be made from any suitable plastic materials, such as polyesters, such as polyethylene terephthalate (PET), polyethylene naphthalate (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC).

The preforms may generally be produced according to an injection molding process and be molded at a location different from the site where the machine for forming containers according to the present invention is located. In a variant, the preform production platform, such as injection molding, compression molding or injection compression, is integrated in the same manufacturing line as the apparatus for manufacturing a filled container of the present invention. In this case, the perform production process is conducted such that the body of the perform remains as close as possible to its optimal processing temperature, whereas the neck part is kept at a temperature as close as possible to ambient temperature to prevent later distortion. In this case, the heating station can be replaced by the preform production platform and the treatment station(s) is placed downstream of the preform production platform. A heating station can however be arranged downstream of the preform production platform in order to submit the preforms to an additional thermal conditioning to optimize the heating profile of the preforms and/or to ensure the activation of the decontamination media optionally introduced in the preforms in the treatment step(s).

A suitable process for hydraulic forming a preform into a container is to provide a heated preform, preferably heated above the glass transition temperature of the preform material, and to force a liquid medium through the opening into the preform at an elevated pressure. The liquid medium then causes the body of the preform to expand. During the expansion, the preform may be placed into a mold such that the body expands until it reaches and conforms to the interior surfaces of the mold. After cooling down, the body of the preform remains in the expanded configuration, now forming a container. By suitably shaping the interior surfaces of the mold, the form of the container may be determined. During the expansion of the preform through the opening, the neck portion may remain relatively unchanged.

The rotary apparatus or machine of the present invention comprises a rotatable forming wheel.

The term "wheel" refers to apparatus components that are used for rotary processing of elements along a manufacturing path. In a rotary process, a sequence of elements is transported along a manufacturing path which essentially follows a circular arc, preferably transported at a constant transportation velocity. A wheel is a suitable means for transporting elements along such an essentially circular manufacturing path. Typically, the elements are temporarily supported on the wheel in vicinity of the circumference of said wheel. The wheel generally has a central axis of rotation running through the center of symmetry of the circular manufacturing path and being essentially perpendicular to the plane of the circular manufacturing path. An essentially circular manufacturing path runs along a portion of the circumference of a circle between an entry point and an exit point. The elements while being transported along the circular manufacturing path may be moved in a radial direction inward or outward. However, the dimension of these movements is substantially smaller than the radial dimension of the circular manufacturing path in most instances.

The term "rotatable wheel" refers to a wheel that is mounted in such a way that it can rotate around its central axis of rotation and may be driven by an actuator. Suitable actuators for driving the rotatable wheel are well known and will not be described here.

The rotary apparatus of the present invention comprises a plurality of forming stations.

The term "forming station" refers to any station that is operable to transform a preform into a container, preferably into a filled container. Each forming station has a longitudinal axis that is generally collinear with the longitudinal axis of the container that is formed in the forming station.

Each of the hydraulic forming stations of the present invention is supported by the forming wheel such that the longitudinal axis of each forming station forms an angle with the plane of rotation of the forming wheel of less than 25° while the preform is expanded. Preferably, the longitudinal axis of each forming station forms an angle with the plane of rotation of the forming wheel of less than 20°, yet more preferably, less than 15°, yet more preferably less than 10°, yet more preferably less than 5° while the preform is expanded. Yet more preferably, the longitudinal axis of each forming station is oriented essentially parallel to the plane of rotation of the forming wheel. In this configuration it is possible that for some positions of the forming station on the forming wheel, gravitational and centrifugal forces for the liquid in the expanding preform act in directions less than 10° degrees different from each other or may even be collinear. Preferably, the resulting force acting on the liquid in these positions forms an angle with the longitudinal axis of the forming station of less than 20°, more preferably less than 10°, yet more preferably less than 5°, yet more preferably less than 3°.

The centrifugal force on the liquid in the preform will always act in the radial direction. Bringing the orientation of the forming station in closer alignment with the plane of rotation and hence with the radial direction will increase the angle between the resulting force (addition of gravitational and centrifugal forces) and the longitudinal direction of the preform. Accordingly, the forces causing the preform to bend away from the longitudinal dimension of the forming station are reduced.

It has been noticed by the inventors that the time for expanding the preform to a container in a hydraulic forming process is relatively short when compared to the period for one revolution of the forming wheel. It is therefore sufficient to have the improved alignment of the resulting force with the longitudinal dimension for that part of the arcuate path during which the actual expansion of the preform takes place. On the other parts of the arcuate path, the preform is not filled with liquid and can withstand the resulting force acting on it or the preform is fully expanded, conforming to the inner surface of the mold, and hence supported against the resulting forces acting on the fully expanded preform.

Each of the hydraulic forming stations of the present invention is supported by the forming wheel such that the projection of the longitudinal axis of each forming stations onto the plane of rotation of the forming wheel forms an angle with the radial direction at the position of the forming station of less than 25°, more preferably less than 20°, yet more preferably less than 15°, yet more preferably less than 10°, for example less than 5° while the preform is expanded. Yet more preferably, each of the hydraulic forming stations of the present invention is supported by the forming wheel such that the projection of the longitudinal axis of each forming stations onto the plane of rotation of the forming wheel is essentially aligned with the radial direction at the position of the forming station.

It is not necessary to fully align the longitudinal dimension of the forming stations with the radial direction in order to benefit from the advantages of the present invention. The alignment is sufficient when the projection of the longitudinal axis of each forming stations is within the boundaries defined above while the preform is expanded.

The hydraulic forming station of the present invention may support a preform such that it is oriented with its longitudinal axis in parallel to the longitudinal axis of the forming station. In this configuration the rotational symmetry axis of the preform may be collinear with the rotational axis of symmetry of the mold. Existing molds are usually operated in a position in which their longitudinal axis is oriented vertically. The preform is simply placed into a preform seat in the top surface of the mold and held in its upright position by the gravitational force. The forming station of the present invention may comprise means for holding and positioning the preform in the orientation with its longitudinal axis aligned with that of the forming stations even if the forming station is not supported in its upright position only. Suitable means include a clamp or gripper which engages with the top and bottom surfaces of the neck of the preform.

The hydraulic forming station may comprise a mold, preferably a mold reversibly openable from a closed configuration to an open configuration. The closed configuration is employed for the forming process. The open configuration is employed for inserting the preform and for extracting the formed container. The mold may consist of two three or more components. To change the configuration of the mold from closed to open, one component, some components, or all components may be moved or rotated between a first and a second positions. Some components of the mold, such as the base, may be movable while the mold is in the closed configuration. The forming station may comprise a mold holder for holding the mold. Different molds may be inserted into the mold holder for adapting the apparatus of the present invention to different container geometries. The mold station may comprise one or more actuators for moving the mold from the open configuration to the closed configuration.

Preferably, the forming station of the present invention is oriented on the forming wheel such that neck of the preform with the opening faces inwardly and the body of the preform faces outwardly. The alignment of the longitudinal dimension of the preform does not have to be fully aligned with the radial direction (as explained above), but it should not be oriented such that the opening is facing outwardly and the liquid would have to be forced inwardly, i.e. against the direction of the centrifugal force, when expanding the preform into a container. With the opening of the preform being positioned at the proximal end of the preform, the centrifugal force acts in the same direction as the one according to which the forming liquid is urged and accordingly supports the hydraulic forming process The hydraulic forming station may comprise a means for stretching the preform, such as a stretch rod, as well as means for actuating the means for stretching, for example as described in US2012/0207872.

The hydraulic forming station may comprise a nozzle means for tightly connecting with the opening of the preform or an upper surface of the mold and a fluid supply means for supplying a pressurized fluid into the preform through the opening after the tight connection has been established.

The hydraulic forming wheel supports a plurality of forming stations.

Preferably the forming wheel supports the plurality of forming stations in such a way that, when the forming wheel is rotating, the forming stations are transported along a circular manufacturing path. The forming stations may be supported along the circumference of the forming wheel.

The hydraulic forming station may be supported by the forming wheel with the longitudinal axis of the forming stations being aligned with the radial direction of the forming wheel at the position of the forming station. Preferably, the forming station is oriented such that the opening of the preform or container is facing the center of the forming wheel and the opposite end of the preform faces radially away from the center of the forming wheel.

Alternatively, the hydraulic forming station may be supported by the forming wheel such that the longitudinal dimension of the forming station forms an angle with the tangential direction of the forming wheel at the position of the forming station of less than 30°, preferably less than 20°, yet preferably less than 15°, yet preferably less than 10°, yet preferably less than 5°, yet preferably less than 3°. Yet more preferably, the longitudinal dimension of the forming station is substantially parallel to the tangential direction of the forming wheel at the position of the forming station.

Alternatively, the hydraulic forming wheel may support the forming stations with a rotational degree of freedom. For example, the support may be designed such that the forming stations may each rotate around an axis of rotation that is essentially parallel to the axis of rotation of the forming wheel. Preferably, the forming wheel further comprises means for keeping the orientation of the longitudinal dimension of the forming stations vertical. Suitable means include for example a plurality of actuators each operably connected with a forming station and rotating the forming stations into the vertical orientation. A cam follower is another suitable means for controlling the orientation of the forming station.

The forming wheel of the present invention may have an axis of rotation that forms an angle of less than 60° with the horizontal plane, preferably less than 45°, yet more preferably less than 30°, yet more preferably less than 20°, yet more preferably less than 10°, yet more preferably, less than 5°. Yet more preferably, the axis of rotation of the forming wheel is oriented essentially in a horizontal direction.

For high speed rotary machines, the resulting force acting on the liquid in the filled container may lead to spillage and deformation of the container. The resulting force is the sum of gravitational and centrifugal forces acting on the liquid. The direction of the centrifugal force depends on the orientation of the axis of rotation. By changing the orientation, the relative positioning of the centrifugal force to the gravitational force can be adjusted. In the ideal case, centrifugal force and gravitational force are collinear to each other and act parallel to the longitudinal axis of the container forcing the consumable into the container. The spatial centrifugal force acting on the consumable and hence on the filled container however varies continuously as the filled container moves along the arcuate manufacturing path in a rotary machine.

The present invention provides a method for hydraulic forming of a shaped container from a preform comprising the steps of:
  placing a preform in a forming station, the forming station having a longitudinal axis,
  transporting the forming station along an arcuate manufacturing path while hydraulically expanding the preform inside the forming station,
  removing a filled shaped container from the forming station.

While the preform is expanded into the shaped container, the orientation of the resulting acceleration on the liquid hydraulically expanding the preform always forms an angle of less than 20°, preferably less than 10°, yet more preferably less than 5°, yet more preferably less than 3° with the longitudinal axis of the forming station. By aligning the direction of the resulting force with the longitudinal direction of the forming station, the detrimental effects of the centrifugal force acting on the expanding preform are reduced. The critical time is the time during which the preform is expanded into a shaped container by forcing a liquid into the container. This time starts with the first liquid being forced into the preform until the preform is expanded to at least 50%, more preferably 75%, yet more preferably 90%, yet more preferably 95% of its final volume. Before that period the mass of the empty preform is not large enough to be seriously impacted by the centrifugal force. Before expansion, the stability of the preform—even after it has been softened for stretching—is sufficient for avoiding significant deformation. After the expansion the shaped container closely conforms to inner surface of the mold and accordingly is supported against the negative effects of the centrifugal forces. During expansion, however, the resulting force acts on the dense liquid inside the preform and can potentially deform the expanding preform if the direction of the resulting force is not in sufficient alignment with the longitudinal direction of the forming station and the expanding preform.

Aligning the direction of the resulting force with the longitudinal direction of the forming station may be achieved through a combination of several structural provisions. The centrifugal force is acting in the radial direction. Aligning the longitudinal direction of the forming station with the radial direction of the forming wheel at the position of the forming station will result in a better alignment of the resulting force. If the forming wheel rotates around a vertical axis of rotation, then the gravitational force will always act perpendicular to the centrifugal force making it very difficult to align the resulting force with the longitudinal direction of a rotary machine. By moving the axis of rotation of the forming wheel from the vertical orientation to an orientation that is closer to being parallel to the horizontal, it is possible to have very good alignment of the resulting force and the longitudinal dimension of the forming station for at least some portions of the arcuate path along the perimeter of the forming wheel. For a forming wheel having a horizontal axis of rotation, the resulting force is in close alignment with the longitudinal dimension of the forming station around the top position and around the bottom position of the forming station.

The present invention further provides a method for hydraulic forming of a shaped container from a preform wherein the longitudinal axis of the forming station is oriented at an angle of less than 20° with the vertical direction when the preform is placed in the forming station. The present invention further provides a method for hydraulic forming of a shaped container from a preform wherein the longitudinal axis of the forming station is oriented at an angle of less than 20° with the vertical direction when the filled shaped container is removed from the forming station.

The present invention further provides a method for hydraulic forming of a shaped container from a preform wherein the shaped container is removed from the forming station in an essentially upright position close to the lowermost position of the forming station on its arcuate path. This orientation of the forming station may be attained by arranging the forming wheel with a horizontal axis of rotation and positioning the forming station in alignment with the radial direction. Having a horizontal axis of rotation and a forming station in alignment with the radial direction avoids the centrifugal force constantly acting in a direction perpendicular to the gravitational force on the expanding preform.

DESCRIPTION OF THE EXEMPLARY EMBODIMENTS

The invention will now be described by referring to exemplary embodiments and the figures.

Figure 2:
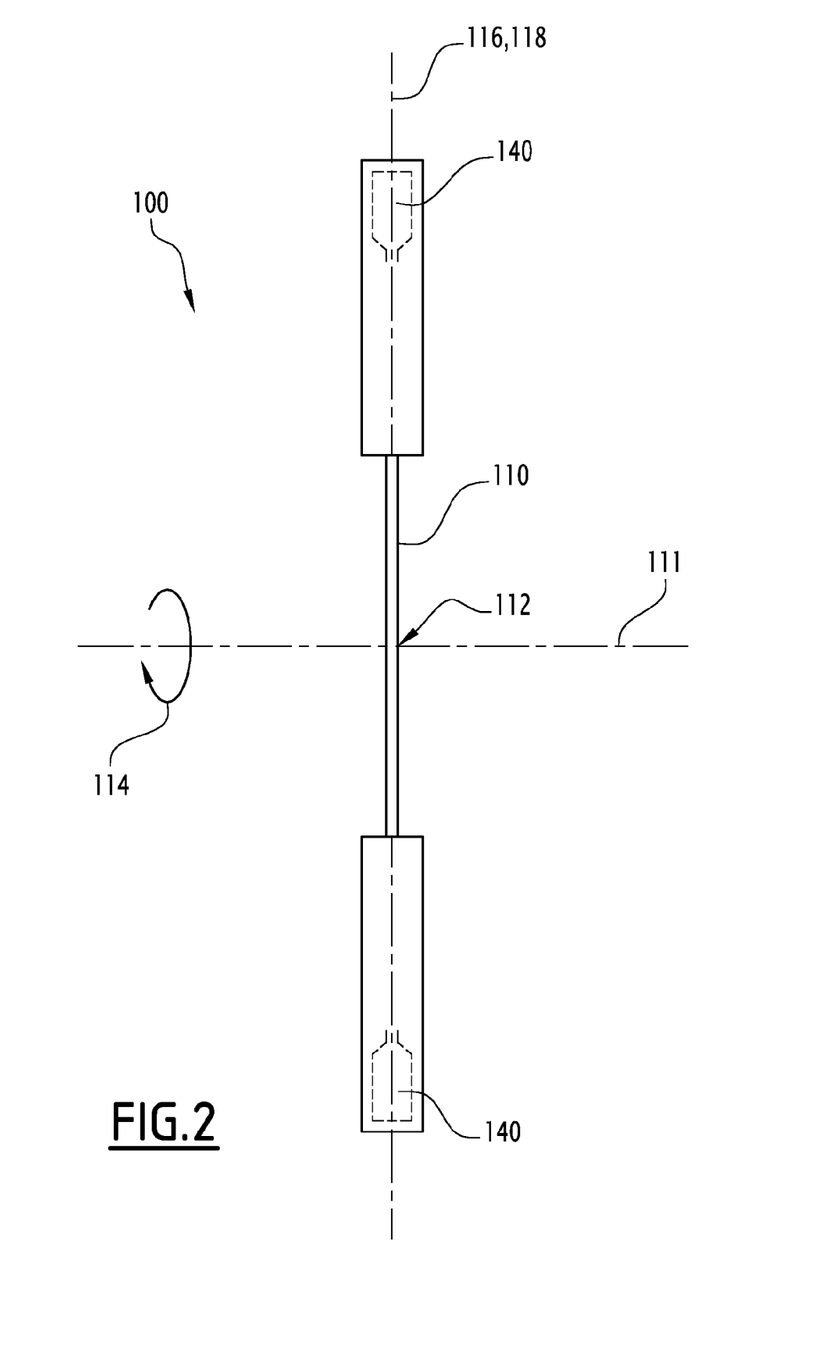

In FIG. 2, a first embodiment of the rotary apparatus or machine 100 for hydraulic forming of shaped containers is shown. The apparatus 100 comprises a rotatable forming wheel 110 which supports a plurality of forming stations 140. The forming stations 140 comprise openable molds and means for forcing the liquid consumable into a preform (not shown). The axis of rotation 111 is oriented parallel to the plane of the drawing at the center 112 of the forming wheel 110. The rotatable wheel 110 can for example be rotated in clock-wise direction 114. The forming stations 140 are arranged with the projection of their longitudinal axis 116 onto the plane of rotation L, essentially parallel to the radial line 118 at the position of the forming station 140. The distal ends of the forming stations 140 are arranged along the perimeter of the rotatable forming wheel 110 with the proximal ends facing towards the center of the forming wheel 110. In the embodiment shown, the molds comprised in the forming stations are arranged such that the bottom of shaped containers is located adjacent to the distal end of the forming station 140 whereas the neck of the shaped containers is facing towards the proximal end of the forming station.

Figure 3:
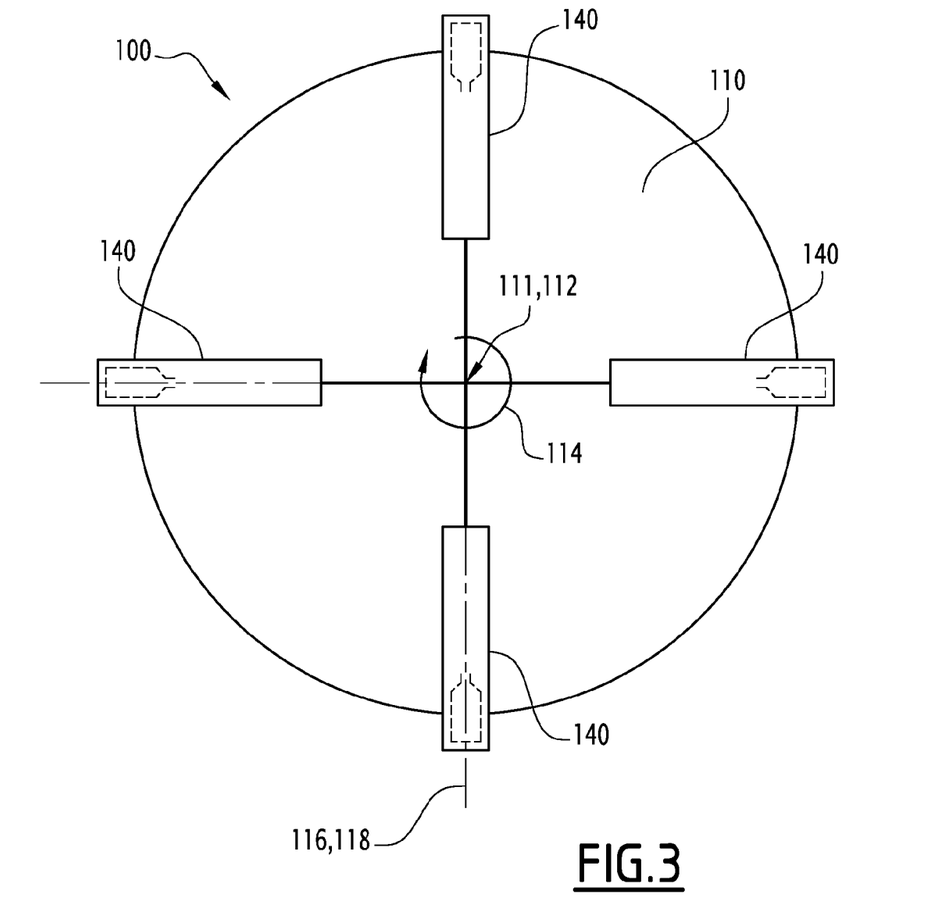
FIG. 3 shows side view of the first embodiment shown in FIG. 2 of the rotary machine for hydraulic forming of shaped containers along the axis of rotation.
Figure 4:
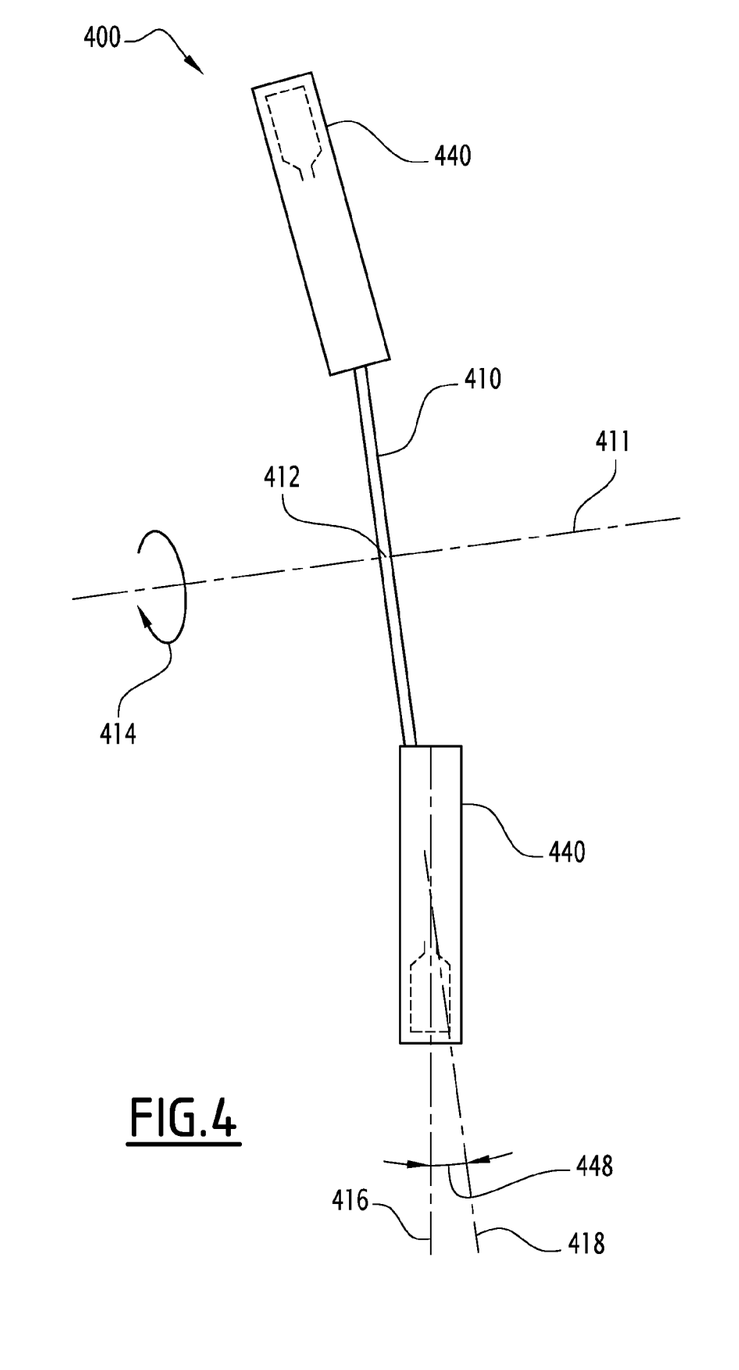
FIG. 4 shows an end view of a second embodiment of the rotary machine for hydraulic forming of shaped containers along a direction parallel to the plane of rotation.

The first embodiment shown in FIG. 2 is depicted in cross-section through the center 112 of the forming wheel 110 and is seen from a direction parallel to the plane of rotation of the forming wheel 110. In FIG. 3, the axis of rotation 111 of the forming wheel 110 is now perpendicular to the plane of the drawing. The forming stations 140 are arranged such that their longitudinal axis 116 is parallel to the radial line 118 at the position of the forming station 140 and accordingly also to the plane of rotation of the forming wheel 110. Referring to FIG. 4, a second embodiment 400 of the rotary apparatus for hydraulic forming of shaped containers is shown in cross section through the center 412 of the forming wheel 410. The forming wheel rotates around its axis of rotation 411 along direction 414. The forming stations 440 are arranged such that their longitudinal axes 416 form an angle 448 with the radial direction and accordingly with the plane of rotation. In the embodiment shown, the axis of rotation 411 is arranged such that at the lowermost position the forming station is in its upright position facilitating easy removal of the filled shaped container from the mold with reduced risk of spillage.

Figure 5:
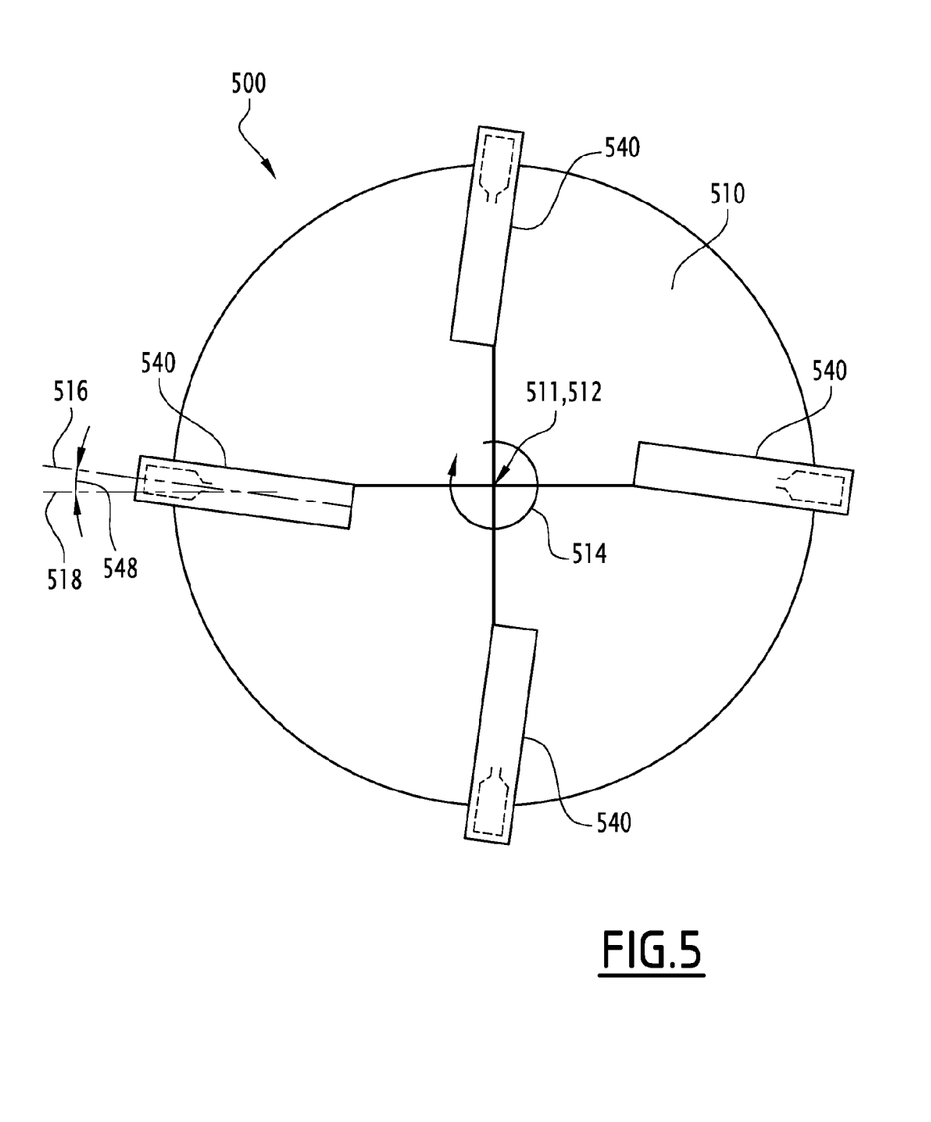
FIG. 5 shows a side view of a third embodiment of the rotary machine for hydraulic forming of shaped containers along the axis of rotation.

A third embodiment 500 of the rotary apparatus for hydraulic forming of shaped containers is shown in FIG. 5 in a side view from a direction parallel to the axis of rotation 511. The forming stations 540 are supported by the forming wheel 510 with the distal ends being positioned close to the perimeter of the forming wheel 510 and the proximal ends facing inwardly towards the axis of rotation 511. The forming stations 540 are arranged such that the projections of their longitudinal axes 516 onto the plane of rotation forms an angle 548 with the radial line 518 at the position of the forming station 540. This angle 548 can facilitate the transfer to and further processing by downstream operation while maintaining sufficient alignment of the resulting force with the radial line 518 to reduce the risk of deformation of the expanding preform.

The invention claimed is:

1. A rotary machine for hydraulic forming containers from preforms, comprising:
   a rotatable forming wheel having a central axis of rotation, a plane of rotation perpendicular to the central axis of rotation and a radial direction also perpendicular to the central axis of rotation,
   a plurality of forming stations, each of the forming stations being supported by the forming wheel and configured to expand one of the preforms into a shaped container by injecting a liquid into the preform,
   wherein a longitudinal axis of each forming station forms an angle with the plane of rotation of the forming wheel of less than 25° while the preform is being expanded,
   and in that the projection of the longitudinal axis of each forming stations onto the plane of rotation of the forming wheel forms an angle with the radial direction of the forming wheel at the position of the forming station of less than 25° while the preform is being expanded.

2. The rotary machine according to claim 1, wherein the forming station is operable to support the preform in an orientation in which the longitudinal axis of the preform is parallel to the longitudinal axis of the forming station.

3. The rotary machine according to claim 1, wherein each forming station has a closed configuration in which the forming station includes a preform seat configured to receive a preform neck and a molding cavity configured to receive a body portion of a preform, wherein the longitudinal axis of each forming station is defined as passing through a center of the preform seat and through a center of the molding cavity, and the radial line is defined as passing through the center of the molding cavity and as being perpendicular to and passing through the central axis of rotation.

4. The rotary machine according to claim 3, wherein the center of the neck seat is closer to the central axis of rotation than the center of the molding cavity at a position where the forming station is operated to expand the preform.

5. The rotary machine according to claim 1, wherein the preform has a neck portion defining an opening and the forming station is oriented on the forming wheel such that the opening of the neck portion is facing inwardly.

6. The rotary machine according to claim 1, wherein the longitudinal axis of each forming station is parallel to the plane of rotation of the forming wheel.

7. The rotary machine according to claim 1, wherein the projection of the longitudinal axis of each forming stations onto the plane of rotation of the forming wheel is aligned with the radial direction at the position of the forming station.

8. The rotary machine according to claim 1, wherein the central axis of rotation of the forming wheel forms an angle of less than 30° with a horizontal plane.

9. The rotary machine according to claim 8, wherein the central axis of rotation of the forming wheel is parallel to the horizontal plane.

* * * * *